United States Patent [19]

Fields

[11] 3,849,274

[45] Nov. 19, 1974

[54] PROCESS FOR COUPLING ORGANIC MOLECULES

[75] Inventor: Ellis K. Fields, River Forest, Ill.

[73] Assignee: Standard Oil Company, Chicago, Ill.

[22] Filed: July 2, 1973

[21] Appl. No.: 375,333

[52] U.S. Cl. ............................................ 204/158 R
[51] Int. Cl. ................................................ B01j 1/10
[58] Field of Search ................................ 204/158 R

[56] References Cited
UNITED STATES PATENTS 3,483,102  12/1969  Arnold et al. ................... 204/158 R

*Primary Examiner*—Howard S. Williams
*Attorney, Agent, or Firm*—Gunar J. Blumberg; Arthur G. Gilkes; William T. McClain

[57] ABSTRACT

A process for coupling organic molecules involving the step of irradiating an organic compound with ultraviolet light in the presence of hexachlorobenzene, hexabromobenzene or hexaiodobenzene under an inert gas. The process is useful for producing an intermolecular carbon-to-carbon bond by a hydrogen abstraction mechanism from such compounds as acetic acid, methyl acetate, diethyl ether, and phenyl acetonitrile.

11 Claims, No Drawings

PROCESS FOR COUPLING ORGANIC MOLECULES

BACKGROUND OF THE INVENTION

Hexachlorobenzene is an unusual molecule particularly when compared to other known chlorinated benzenes. It is distorted from a perfectly planar configuration because of steric crowding amongst the six bulky chlorine atoms (see: O. Bastiansen and O. Hassel, *Acta Chem. Scand.*, 1, 489 (1947); T. Saito, *Bull. Chem. Soc. Japan* 33, 343 (1960); I. N. Strelsova and Y. T. Struckhov, *Zh. Strukt. Khim*, 2, 312 (1961). In spite of this crowding, it is thermally extremely stable, being recovered unchanged after 30 seconds at 700°C. But, I have discovered, when raised to the excited state, by ultraviolet (UV) irradiation, hexachlorobenzene surprisingly dissociates readily to $C_6H_5\cdot$ and $Cl\cdot$.

I have discovered, in addition, that this dissociation of hexachlorobenzene will also occur in the presence of many common organic reagents when subject to UV light. The free radicals produced can then abstract hydrogen (a proton) from the reagent molecules. These molecules will subsequently couple through what is predominantly an intermolecular carbon-to-carbon bond, forming useful products by a novel process.

DESCRIPTION OF THE INVENTION

I have discovered that a hexahalobenzene such as hexachlorobenzene, hexabromobenzene or hexaiodobenzene under UV irradiation in the presence of a suitable substrate brings about coupling of these organic molecules. The coupling reaction of this invention apparently involves both dehydrogenation and dimerization; dimerization in the sense that two previously independent molecules are coupled through the formation of an intermolecular carbon-to-carbon bond, and dehydrogenation in the sense that the formation of the bond involves the abstraction of at least one hydrogen (a proton) from each molecule. Thus, I have discovered a new process for coupling organic molecules involving the step of irradiating an organic compound containing at least one abstractable hydrogen, with ultraviolet light in the presence of hexachlorobenzene, hexabromobenzene, or hexaiodobenzene.

One possible mechanistic interpretation of the chemistry of this new process involves three steps and four reactions. Step 1 is the photo-initiated dissociation of the hexahalobenzene into free radicals; step 2 is the abstraction of hydrogen from an organic compound by either of the free radicals produced in step 1, and step 3 is the intermolecular coupling of the product from step 2. Although it may not be the only possible mechanistic view of this invention, and the disclosure should not be so limited, it is felt that this mechanism is consistent with known facts and is useful in interpreting and rationalizing the presence of certain products. However, it is known that this view is a simplification of a far more complex photo-chemical process as will be apparent from reading the full disclosure and examples. To summarize further this mechanistic view, the following chemical equations illustrate the specific embodiment of hexachlorobenzene irradiated by UV light in an excess of acetic acid.

Step 1 (free radical generation)

Step 2 (hydrogen abstraction)

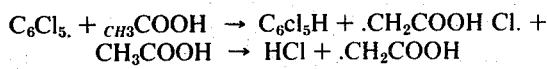

Step 3 (coupling)

Step 1 illustrates the role of the hexahalobenzene in this invention. Upon UV radiation the hexahalobenzene readily dissociates into a pentahalobenzene radical and a halogen radical. The ease of this dissociation has the added advantage of allowing the use of relatively low-energy UV light sources; i.e., frequencies which approach the visible portion of the spectrum. This advantage arises because competing photolysis-type reactions caused by higher energy UV radiation can be minimized without essentially effecting the coupling reaction of this invention.

The hexahalobenzenes which can be readily dissociated according to the process include hexachlorobenzene, hexabromobenzene, and hexaiodobenzene. Because of the ease of synthesis and low cost hexachlorobenzene will have the greatest utility and is preferred.

Step 1, as illustrated, is a simplification in that the hexachlorobenzene can probably be dissociated in a stepwise manner. In all reactions, more than one chlorine atom from hexachlorobenzene is involved. Two specific experimental facts verify this position. The products, after irradiation, include a distribution of chlorobenzenes containing from 1 to 6 chlorine atoms, and the mole percent of coupled product based on the amount of hexachlorobenzene used frequently exceeds 100 percent. Thus, the three mechanistic steps do not rigorously correspond to the overall stoichiometry.

With respect to the specific embodiment illustrated, other chlorinated benzenes such as o-dichlorobenzene and 1, 2, 4-trichlorobenzene are relatively ineffective under the conditions of my process; e.g., from a mixture of 1, 2, 4-trichlorobenzene and acetic acid, irradiated for 21 hours according to this process, 97 percent of the 1, 2, 4-trichlorobenzene was recovered unchanged with a corresponding decrease in yield of coupled product. Thus the presence of the hexachlorobenzene is preferred and necessary to achieve reasonable reaction rates.

In addition, prior art would indicate that chloroacetic acid should be an intermediate in this reaction. However, irradiation of chloroacetic acid under the conditions of my process gave no succinic acid.

The irradiation step of this invention is performed by using any convenient source of ultraviolet light. A high-pressure mercury arc burner of about 100 to 5,000 watt output, such as the Hanovia 679-A36 mercury arc ultraviolet 450 watt burner, is operative. Preferably a source having a major portion of its radiation output within a characteristic wavelength range of about 2,000 to 4,000 angstroms is to be used; however, broader ranges within the UV spectrum are also operative. The presence of other types of low energy electromagnetic radiation, say from the infrared or visible region, is not deleterious to the process. Excess high energy radiation tends to promote competing reactions.

The time of reaction can be conveniently from about 1 to 100 hours. Significant quantities of coupled product have been observed with as little as 15 minutes of irradiation.

The temperature of the irradiation can conveniently be adjusted from about 0° to 250°C, depending on the nature of the organic compound which is to be coupled. Preferably the organic compound, itself, serves as the solvent or fluid media during the irradiations, but cosolvents are within the contemplated scope of this invention. Thus, preferably the temperature and pressure are selected such that the organic compound remains in a fluid state. Conveniently the heat generated from the UV source can be utilized to maintain the higher melting compounds in a fluid state.

This novel coupling process is suitably run under a blanket of inert gas. By inert gas I mean any vapor which is not a competitive reactant under the chosen conditions. Thus the noble gases (e.g., helium or argon), nitrogen, the organic compound itself (particularly if irradiation is close to or at the boiling point) or any other nonreactive gas can be used. The inert gas can be conveniently used to stir the reaction media as well as sweep out gaseous products and HCl. Nitrogen is the preferred inert gas.

The overall process can be run in a batch mode, or a continuous mode. Recycling of reactants is feasible. Preferably the reaction medium is isolated from the UV source by either quartz, vycor glass, or some other suitable material which transmits wave lengths below 4,000 angstroms.

The mole ratios of hexachlorobenzene to organic compound can vary from 1:1 to 1:200. Under these stated ranges of reaction conditions, quantum yields from about 0.04 to 0.3 can be achieved.

The acceptable organic compounds which are to be coupled by this invention has to possess at least one abstractable hydrogen. As illustrated in step 2, the abstractable hydrogen is bonded to an aliphatic alpha carbon, i.e., an aliphatic carbon located next to one or more reactive groups. The reactive groups of this invention include the common organic functional groups such as the carboxy (—COOH), carboalkoxy (—COOR), alkoxy (—OR), cyano (—C≡N), alkylthio (—SR), perfloromethyl (—CF$_3$) as well as other organic functional groups which do not, in themselves, possess a readily abstractable hydrogen. Thus, such groups as the hydroxyl and mercapto are not acceptable. Other acceptable groups include aryl groups, e.g., phenyl, biphenyl, naphthyl, and phenanthryl; substituted aryls; halogens, e.g., fluorine and chlorine; and the nitro group.

The preferred class of compounds for my invention will include the organic acids having from 2 to 22 carbons, the esters of these acids made from alcohols having from 1 to 22 carbon atoms, organic ethers having two organic units of up to 22 carbon atoms at least one of which is two carbons in length, and organic nitriles having chain lengths as long as 22 carbon atoms. The preferred species are acetic acid, methyl acetate, diethyl ether, and phenylacetonitrile.

Under the reaction conditions of this invention, the predominant hydrogen abstraction occurs at the alpha carbon. However, a mixture of products will be created particularly if the substrate has more than one alpha carbon. In some cases, even the possibility of intramolecular coupling is conceivable. However, the preferred process involves a single alpha carbon per reactant molecule. This results in a carbon-to-carbon bond between the alpha carbons of two reactant molecules as illustrated in step 3. Again, this mechanistic view is a simplification in that the possibility of more than one hydrogen being abstracted at the alpha carbon resulting in a double bond is within the scope of this invention.

Having thus described my invention the following examples are presented as further illustrations of specific embodiments and as such should not be interpreted as being unduly limiting.

EXAMPLE I

A mixture of 5.70 grams (0.02 mole) of hexachlorobenzene and 300 ml of acetic acid was agitated at 60°C by a stream of nitrogen at 200 cc/minute while being irradiated by a Hanovia 679-A36 mercury arc ultraviolet 450 watt burner for 5 hours through a quartz well. The acetic acid solution was distilled to recover 285 ml of acetic acid. The pot residue was cooled, dissolved in 150 ml of ether, chilled to 10°C and then filtered. Succinic acid, 2.6 grams, was thus obtained, having a melting point of 190°C and a mixed melting point with an authentic sample of 190°C. Esterification gas chromatography determined that the filtrate contained another 1.6 grams of succinic acid. Thus the total yield of succinic acid was 4.2 grams, or 256 mole percent based on hexachlorobenzene. Succinic acid is widely used in a variety of products.

EXAMPLE II

A mixture of 17.09 grams (0.06 mole) of hexachlorobenzene and 400 ml of methyl acetate was agitated at 30°C by a stream of nitrogen at 100 cc/minute while being irradiated by a Hanovia 679-A36 450 watt UV burner for 7 hours. The mixture was filtered from 3.6g of hexachlorobenzene and distilled to recover 370ml of methyl acetate. The residue contained 6.43g of dimethyl fumarate, 107 mole % yield, and 0.22g of dimethyl succinate, 3.2 mole % yield. Fumaric esters are useful for copolymerizing with vinyl acetates to yield internally plasticized emulsions for permanently tacky adhesives.

EXAMPLE III

A mixture of 5.2g (0.0183 mole) of hexachlorobenzene and 205 ml of ether was stirred under nitrogen at 30°C for 9 hours while being irradiated by a 550 watt Hanovia UV burner. All the solid had gone into solution by this time. The solution was distilled to recover 156 ml of diethyl ether and leave a residue that by mass and nuclear magnetic resonance spectroscopy analysis contained 7.05 g 2,3-diethoxybutane. 2,3-Diethoxybutane may be used in hydraulic fluids and as a solvent.

EXAMPLE IV

A solution of 5.70g (0.02 mole) of hexachlorobenzene in 170 ml of phenylacetonitrile was irradiated at 90°C under nitrogen by a 450 watt Hanovia UV burner for 7.5 hours. The solution was cooled at 20°C, filtered from 1.7g of hexachlorobenzene, and distilled to recover 164 ml of phenylacetonitrile. The residue, by gas-chromatographic analysis, contained 0.91g, 30 mole % of 1,2-dicyano-1,2-diphenylethane. 1,2-Dicyano-1,2-diphenylethane is useful as a dye intermediate.

EXAMPLE V

A solution of 11.39g (0.04 mole) of hexachlorobenzene in 92 ml (0.8 mole) of phenylacetonitrile was irradiated and refluxed at 235°C by a Hanovia high-pressure mercury arc UV lamp through a quartz flask, for 6 hours. The cooled solution was filtered from 5.5g of hexachlorobenzene and distilled to recover 85 ml of phenylacetonitrile. The residue, by gas-chromatographic analysis, contained 4.71g (58 mole % yield) of 1,2-dicyano-1,2-diphenylethane.

I claim:

1. A process for coupling organic molecules involving the step of irradiating an organic compound containing at least one abstractable hydrogen with ultraviolet light in the presence of hexachlorobenzene, hexabromobenzene, or hexaiodobenzene.

2. A process of claim 1 wherein the irradiating is performed in the presence of hexachlorobenzene.

3. A process of claim 2 wherein the abstractable hydrogen is bonded to an aliphatic carbon alpha to a radical selected from the group consisting of carboxy, carboalkoxy, alkoxy, cyano, alkylthio, perfloromethyl, fluoro, chloro, nitro, phenyl, biphenyl, naphthyl, phenanthryl or substituted aryl.

4. A process of claim 2 wherein the organic compound is selected from a group consisting of an organic acid, ester, ether and nitrile.

5. A process of claim 4 wherein the organic compound is selected from a group consisting of acetic acid, methyl acetate, diethyl ether and phenylacetonitrile.

6. A process of claim 2 wherein the organic compound is agitated during irradiation by a stream of inert gas at a temperature and pressure which maintains said organic compound in the liquid phase.

7. A process of claim 6 wherein the organic compound is selected from a group consisting of acetic acid, methyl acetate, diethylether and phenylacetonitrile.

8. A process of claim 6 wherein the mole ratio of organic compound to hexachlorobenzene is from about 1:1 to about 200:1.

9. A process of claim 8 wherein irradiation is performed by the use of a high pressure mercury arc burner having about a 100 to 5,000 watt output, through a quartz or vycor glass for a period of about 1 to 100 hours.

10. A process of claim 9 wherein the inert gas is nitrogen.

11. A process of claim 10 wherein the organic compound is selected from a group consisting of acetic acid, methyl acetate, diethylether and phenylacetonitrile.

* * * * *

PO-1050
(5/69)

UNITED STATES PATENT OFFICE
CERTIFICATE OF CORRECTION

Patent No. 3,849,274   Dated November 19, 1974

Inventor(s) Fields, Ellis K.

It is certified that error appears in the above-identified patent and that said Letters Patent are hereby corrected as shown below:

Column 1, line 66 in the Formula for Step 1 "$C_6Cl_6 \rightarrow V\ C_6Cl_5 \cdot + cl.$"

Should be $C_6Cl_6 \xrightarrow{h\nu} C_6Cl_5\cdot + Cl$. Per Specification Page 3, line 2.

Column 2, line 1 in the Formula for Step 2 "$C_6Cl_5\cdot + CH_3COOH \rightarrow C_6Cl_5H +$"

Should be $C_6Cl_5\cdot + CH_3COOH \rightarrow C_6Cl_5H +$. Per Specification, Page 3, line 4.

Signed and sealed this 18th day of February 1975.

(SEAL)
Attest:

RUTH C. MASON
Attesting Officer

C. MARSHALL DANN
Commissioner of Patents
and Trademarks